United States Patent Office 2,985,683
Patented May 23, 1961

2,985,683
TETRANITRODIETHYLAMINE DERIVATIVES
Karl Klager, 168 N. Canyon Blvd., Monrovia, Calif.
No Drawing. Filed Jan. 7, 1957, Ser. No. 632,947
16 Claims. (Cl. 260—465.5)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of applicant's copending application Serial No. 258,977, filed November 29, 1951, for Tetranitrodiethylamine Derivatives and Process for Preparing Same, now abandoned.

This invention relates to new tetranitrodiethylamine derivatives and to a process for the preparation thereof. Specifically, these new compounds may be represented by the following structural formula:

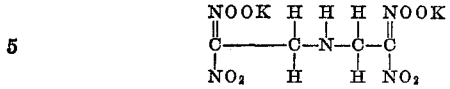

in which $R^1$ represents a member of the group including hydrogen, halogen, and alkali metals, and $R^2$ represents a member of the group including cyano, nitro, and nitroso. It will be understood that when $R^1$ represents an alkali metal, potassium for example, that atom will be associated with one of the nitro groups adjacent to the carbon atom rather than with the carbon atom directly. As examples of compounds coming within the scope of the above mentioned formula, there may be mentioned the following: 2,2'-dibromo-N-cyano-2,2,2',2'-tetranitrodiethylamine, dipotassium N-nitro-2,2,2',2'-tetranitrodiethylamine, N-nitroso-2,2,2',2'-tetranitrodiethylamine, N-cyano-2,2,2',2'-tetranitrodiethylamine, and the like.

An object of the invention is to provide new nitro compounds. Another object of the invention is to provide a process for the production of new tetranitrodiethylamines. A further object is to provide a process for reacting tetranitrodiethylamine with other nitrogen containing compounds under moderate, controlled conditions to form N-substituted tetranitrodiethylamines. Further objects will appear hereinafter.

Prior to the instant invention, investigators utilized reactions involving drastic conditions of temperature and pressure to form various nitrogen containing aliphatic compounds. It has been discovered that dipotassium 2,2,2',2'-tetranitrodiethylamine reacts readily with certain nitrogen containing compounds in aqueous solution at moderate temperatures and at atmospheric pressure. The yields are nearly quantitative, and there is very little difficulty with side reactions or in isolating the desired products. 2,2'-dibromo-2,2,2',2'-tetranitrodiethylamine undergoes reaction with nitric acid to form either the nitroso or the nitro derivative depending upon the concentration of the nitric acid. The cyano derivative forms with such ease that it is sufficient to employ a salt containing the cyano radical for the reaction with tetranitrodiethylamines. The nitroso member may also be derived from a salt, e.g., sodium nitrite. Temperatures ranging from 0° to 85° C. may conveniently be employed in carrying out the reactions.

The 2,2,2',2'-tetranitrodiethylamine contemplated by the invention is represented, in the form of the potassium salt, by the following formula:

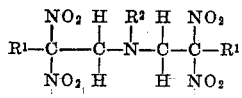

It will be evident that the potassium associated with the nitro group may be replaced by hydrogen or halogen attached directly to the adjacent carbon atom without change in the properties of the compound as a secondary amine.

The examples which follow are illustrative of the various types of tetranitrodiethylamine derivatives that come within the scope of the invention. They are likewise illustrative of the procedures whereby these new chemical compounds may be synthesized.

*Example I.*—80 gm. of 2,2'-dibromo-2,2,2',2'-tetranitrodiethylamine was added in small portions to 300 ml. nitric acid (70%) at a temperature of 60° to 65° C. with good agitation. Red brown gases were developed. After 30 minutes of additional stirring at the same temperature, the reaction mixture was heated to 70° C. for a short time. After cooling the mixture to room temperature, the precipitated N-nitroso-2,2'-dibromo-2,2,2',2'-tetranitrodiethylamine was collected on a filter and washed with water until free from nitric acid. The dry material had a melting point of 117° to 118° C.

*Example II.*—3 gm. of 2,2'-dibromo-2,2,2',2'-tetranitrodiethylamine was dissolved in 30 ml. sulfuric acid and 1.5 gm. sodium nitrate slowly added with vigorous stirring. After standing for 4 hours the solution was mixed with 300 ml. ice water. The precipitated white crystals were filtered off and washed with water. After being twice recrystallized from isopropylether the material melted at 116° to 117° C. and was identical with the N-nitroso-2,2'-dibromo-2,2,2',2'-tetranitrodiethylamine obtained by means of the procedure given in Example I.

*Example III.*—A suspension of 9.16 gm. N-nitroso-2,2'-dibromo-2,2,2',2'-tetranitrodiethylamine in 50 ml. of methanol cooled to 0° C. was prepared. A solution, prepared from 2.6 gm. KCN, 15 ml. water and 15 ml. methanol, was added dropwise into the suspension while stirring rapidly. The resulting yellow precipitate obtained was filtered and washed with methanol. The yield was 11 gm. of damp dipotassium salt of N-nitroso-2,2,2',2'-tetranitrodiethylamine.

*Example IV.*—8 gm. of damp dipotassium N-nitroso-2,2,2',2'-tetranitrodiethylamine was suspended in 35 ml. water. To this suspension, 100 ml. dichloromethane was added and 15 ml. of dilute sulfuric acid (1:4 concentrated acid to water by weight) dropped into the mixture while stirring rapidly. The temperature was kept at 0° C. The yellow salt disappeared quickly and the reaction mixture became colorless. After separating the two layers in a separatory funnel, the dichloromethane solution was dried over sodium sulfate and then evaporated. The remaining yellow oil crystallized when cooled to −70° C. After recrystallization from dichloromethane, the N-nitroso-2,2,2',2'-tetranitrodiethylamine obtained melted at 61° C. with decomposition.

*Example V.*—A three-necked flask fitted with a stirrer, dropping funnel and thermometer was charged with 16.5 gm. 2,2'-dibromo-2,2,2',2'-tetranitrodiethylamine dissolved in 150 ml. methanol. A solution prepared from 11 gm. potassium cyanide dissolved in 22 ml. water and 20 ml. methanol was dropped into the flask with efficient stirring while keeping the temperature of the reaction mixture at 0° to 10° C. After all the potassium cyanide solution had been added, the stirring was continued for 50 minutes. The yellow precipitate was then filtered off and washed with methanol. The yield was 20 gm. of damp, crude dipotassium N-cyano-2,2,2',2'-tetranitrodiethylamine. For purification, the salt was suspended in 250 ml. water and brominated at 0° to 10° C. until the color of bromine was no longer bleached. After fifteen minutes of additional stirring, the precipitated N-cyano-2,2'-dibromo-2,2,2',2'-tetranitrodiethylamine was filtered off, washed with water, dried, and recrystallized from chloroform. The yield was 9.1 gm. of substantially pure compound having a melting point of 157° to 158° C.

*Example VI.*—A three-necked flask provided with a stirrer, dropping funnel and thermometer was charged with 130 ml. methanol and 13.1 gm. N-cyano-2,2'-dibromo-2,2,2',2'-tetranitrodiethylamine. A solution prepared from 4.3 gm. potassium cyanide, 10 ml. water and 10 ml. methanol was dropped into the suspension in the flask while keeping the reaction mixture at a temperature of 0° to 10° C. After stirring for an additional fifteen minutes, the yellow dipotassium salt of N-cyano-2,2,2',2'-tetranitrodiethylamine was filtered off and washed with methanol.

*Example VII.*—Three gm. of dipotassium N-cyano-2,2,2',-2'-tetranitrodiethylamine was suspended in 75 ml. water and acidified with 20% sulfuric acid. The yellow precipitate disappeared and a white precipitate was formed. After filtration and washing with water until free from acid, the white crystals of N-cyano-2,2,2',2'-tetranitrodiethylamine were dried. The melting point was 88° C. with decomposition.

*Example VIII.*—5 gm. of 2,2'-dibromo-2,2,2',2'-tetranitrodiethylamine was introduced in small quantities into 50 ml. fuming nitric acid at a temperature of 60° C. Red brown gases were evolved. After all material was added, the mixture was stirred for 30 minutes at 65° to 70° C. A white precipitate was formed. After cooling to room temperature, the N-nitro-2,2'-dibromo-2,2,2',-2'-tetranitrodiethylamine was filtered off and washed with 70% nitric acid and water. The melting point of the compound was 165° to 167° C. with decomposition.

*Example IX.*—A suspension of 7.6 gm. N-nitro-2,2'-dibromo-2,2,2',2'-tetranitrodiethylamine in 75 ml. methanol was prepared and cooled to 0° C. A solution of 15 gm. potassium iodide in 15 ml. water and 15 ml. methanol was added dropwise to the suspension while stirring rapidly. Free iodine was formed and a yellow precipitate appeared. After 30 minutes of additional stirring, the resulting dipotassium salt of N-nitro-2,2,2',2'-tetranitrodiethylamine was filtered off and washed with methanol until free from iodine. The yield was 93.7% of theoretical.

*Example X.*—1 gm. of dipotassium N-nitro-2,2,2',2'-tetranitrodiethylamine was suspended in 10 ml. water, and dilute sulfuric acid (1:4 acid to water by volume) was added until the yellow color disappeared. A white crystalline precipitate was formed. After filtration and washing with ether, the N-nitro-2,2,2',2'-tetranitrodiethylamine was dried in a desiccator. The yield was 0.4 gm. of the compound which had a melting point of 78° C. with decomposition.

The highly nitrated compounds resulting from the above described process are valuable explosives intermediates since they have a favorable oxygen balance, are relatively stable, form uniform crystals, and are smokeless.

The compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact or time fuse-mechanism firing a detonating explosive such as lead azide or mercury fulminate.

Obviously many modifications and variations of the present invention are possible in the light of the above teachings. It is therefore to be understood that within the scope of the appended claims the invention may be practiced otherwise than as specifically described.

What is claimed is:

1. Tetranitrodiethylamines having the formula:

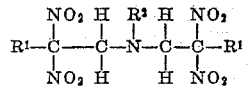

in which $R^1$ is a member selected from the group consisting of hydrogen, chlorine, bromine, and fluorine; and $R^2$ is a member selected from the group consisting of nitroso, cyano, and nitro.

2. N-nitroso-2,2,2',2'-tetranitrodiethylamine.
3. N-cyano-2,2,2',2'-tetranitrodiethylamine.
4. N-nitro-2,2,2',2'-tetranitrodiethylamine.
5. N-nitroso-2,2'-dibromo-2,2,2',2'-tetranitrodiethylamine.
6. N-cyano-2,2'-dibromo-2,2,2',2'-tetranitrodiethylamine.
7. N-nitro-2,2'-dibromo-2,2,2',2'-tetranitrodiethylamine.
8. The method of preparing tetranitrodiethylamine compositions having the structural formula:

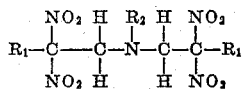

wherein $R_1$ is a member selected from the group consisting of chlorine, bromine and fluorine, and $R_2$ is a member selected from the group consisting of nitroso, cyano and nitro, which comprises reacting a tetranitrodiethylamine composition having the structural formula:

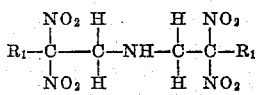

wherein $R_1$ is a member selected from the group consisting of chlorine, bromine and fluorine, with a reactant selected from the group consisting of dilute nitric acid, a mixture of sulfuric acid and sodium nitrate, concentrated nitric acid, and an aqueous solution of potassium cyanide.

9. The method of preparing tetranitrodiethylamine compositions having the structural formula:

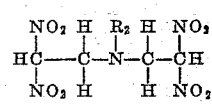

wherein $R_2$ is a member selected from the group consisting of nitro, nitroso and cyano, which comprises reacting a salt having the structural formula:

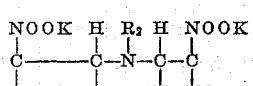

wherein $R_2$ is a member selected from the group consisting of nitro, nitroso and cyano, with dilute acid.

10. The method of preparing N-nitroso-2,2'-dibromo-2,2,2',2'-tetranitrodiethylamine which comprises reacting 2,2'-dibromo-2,2,2',2'-tetranitrodiethylamine with aqueous nitric acid having a concentration of about 70% nitric acid.

11. The method of preparing N-nitroso-2,2'-dibromo-2,2,2'-2'-tetranitrodiethylamine which comprises reacting 2,2'-dibromo-2,2,2',2'-tetranitrodiethylamine with a mixture of sulfuric acid and sodium nitrate.

12. The method of preparing N-nitro-2,2'-dibromo-2,2,2',2'-tetranitrodiethylamine which comprises reacting 2,2'-dibromo-2,2,2',2'-tetranitrodiethylamine with fuming nitric acid.

13. The method of preparing N-cyano-2,2,2',2'-tetranitrodiethylamine which comprises reacting 2,2'-dibromo-2,2,2',2'-tetranitrodiethylamine with an aqueous solution of potassium cyanide to form dipotassium N-cyano-2,2,2',2'-tetranitrodiethylamine and thereafter neutralizing the said dipotassium salt with bromine in aqueous solution.

14. The method of preparing N-nitroso-2,2,2',2'-tetranitrodiethylamine which comprises reacting dipotassium N-nitroso-2,2,2',2'-tetranitrodiethylamine with dilute sulfuric acid.

15. The method of preparing N-nitro-2,2,2',2'-tetranitrodiethylamine which comprises reacting dipotassium N-nitro-2,2,2',2'-tetranitrodiethylamine with dilute sulfuric acid.

16. The method of preparing N-cyano-2,2,2',2'-tetranitrodiethylamine which comprises reacting dipotassium N-cyano-2,2,2',2'-tetranitrodiethylamine with dilute sulfuric acid.

References Cited in the file of this patent

UNITED STATES PATENTS

| | | |
|---|---|---|
| 2,731,460 | Schenck et al. | Jan. 17, 1956 |
| 2,901,512 | Klager | Aug. 25, 1959 |

OTHER REFERENCES

Degering: "An Outline Organic Nitrogen Compounds" (1945), page 213.